(12) United States Patent
Reichart et al.

(10) Patent No.: US 10,231,285 B1
(45) Date of Patent: Mar. 12, 2019

(54) COGNITIVE MASSAGE DYNAMIC RESPONSE OPTIMIZATION

(71) Applicant: INTERNATIONAL BUSINESS MACHINES CORPORATION, Armonk, NY (US)

(72) Inventors: Thomas E. Reichart, Columbia, MO (US); Benjamin C. Wisnewski, Columbia, MO (US); Daniel G. Yates, Columbia, MO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/918,913

(22) Filed: Mar. 12, 2018

(51) Int. Cl.
| H04W 4/00 | (2018.01) |
| H04W 88/18 | (2009.01) |
| H04W 4/14 | (2009.01) |
| H04L 12/58 | (2006.01) |
| G06F 17/27 | (2006.01) |
| G06F 17/30 | (2006.01) |

(Continued)

(52) U.S. Cl.
CPC ...... *H04W 88/184* (2013.01); *G06F 17/2785* (2013.01); *G06F 17/30598* (2013.01); *H04L 51/16* (2013.01); *H04L 51/38* (2013.01); *H04W 4/14* (2013.01); *H04M 1/72519* (2013.01); *H04W 8/245* (2013.01)

(58) Field of Classification Search
CPC ... H04W 88/184; H04W 4/14; G06F 17/2785; G06F 17/30598; H04L 51/16; H04L 51/38; H04M 1/72519
USPC ..................................... 455/466, 418, 550.1
See application file for complete search history.

(56) References Cited

U.S. PATENT DOCUMENTS

| 6,085,201 A * | 7/2000 | Tso ........................ G06F 17/277 |
| | | 715/205 |
| 6,718,368 B1 | 4/2004 | Ayyadurai |
| 8,270,933 B2 | 9/2012 | Riemer et al. |

(Continued)

FOREIGN PATENT DOCUMENTS

WO     2010133830 A1     11/2010

OTHER PUBLICATIONS

Gil, "How to Create Auto-Reply Messages on Your iPhone," iDownloadBlog, Jul. 11, 2013, p. 1-3, http://www.downloadblog.com/2013/07/11/how-to-customize-auto-reply/, Accessed on Mar. 7, 2018.

(Continued)

*Primary Examiner* — Danh C Le
(74) *Attorney, Agent, or Firm* — Aleixs N. Hatzis

(57) ABSTRACT

A method, computer system, and a computer program product for dynamic cognitive responses is provided. The present invention may include enabling a dynamic cognitive response program via a mobile application. The present invention may then include receiving a text message from an initiating device on a recipient device of the dynamic cognitive response program. The present invention may then include activating the dynamic cognitive response program based on the received text message. The present invention may then include analyzing the received text message on the recipient device. The present invention may include generating an intelligent response based on the analyzed received text message. The present invention may then include sending the generated intelligent response to the initiating device.

17 Claims, 6 Drawing Sheets

(51) Int. Cl.
*H04W 8/24* (2009.01)
*H04M 1/725* (2006.01)

(56) References Cited

U.S. PATENT DOCUMENTS

| | | | |
|---|---|---|---|
| 9,268,765 B1* | 2/2016 | Rose Charvet | G06F 17/274 |
| 9,294,890 B1 | 3/2016 | Boutcher et al. | |
| 9,743,260 B2 | 8/2017 | Wilson et al. | |
| 2002/0187794 A1 | 12/2002 | Fostick et al. | |
| 2007/0238474 A1 | 10/2007 | Ballas et al. | |
| 2008/0147407 A1* | 6/2008 | Da Palma | G10L 15/22 |
| | | | 704/260 |
| 2009/0221279 A1 | 9/2009 | Rutledge | |
| 2011/0163414 A1* | 7/2011 | Lin | H01L 23/3128 |
| | | | 257/531 |
| 2012/0094700 A1* | 4/2012 | Karmarkar | G06F 3/013 |
| | | | 455/466 |
| 2012/0284093 A1* | 11/2012 | Evans | H04W 4/21 |
| | | | 705/14.1 |
| 2013/0054613 A1* | 2/2013 | Bishop | G06F 17/30011 |
| | | | 707/748 |
| 2013/0303196 A1* | 11/2013 | Mitchell | G01S 5/0018 |
| | | | 455/456.3 |
| 2016/0188565 A1* | 6/2016 | Robichaud | G06F 17/278 |
| | | | 704/9 |

OTHER PUBLICATIONS

Mell et al., "The NIST Definition of Cloud Computing," National Institute of Standards and Technology, Sep. 2011, p. 1-3, Special Publication 800-145.

Moin, "Don't Text Me: Auto Reply Text Messages While You Are Busy," Make Use Of, Apr. 18, 2010, p. 1-3, https://www.makeuseof.com/tag/dont-text-me-auto-reply-text-messages/, Accessed on Mar. 8, 2018.

T, "New Feature Alert: Auto-Reply to Texts has Arrived!," Burner Blog, Apr. 28, 2015, p. 1-4, Ad Hoc Labs, https://www.burnerapp.com/blog/2015/4/23/new-feature-alert-auto-reply-to-texts-has-arrived, Accessed on Mar. 7, 2018.

Verizon, "Turn on Auto Reply—Verizon Messages—Android® Smartphone," Verizon Wireless Support, p. 1-4, https://www.verizonwireless.com/support/knowledge-base-74755/, Accessed on Mar. 7, 2018.

Wolber et al., "No Texting While Driving," App Inventor 2: Create Your Own Android Apps, 2014, p. 51-68, Chapter 4, 2nd Edition, O'Reilly Media.

* cited by examiner

COGNITIVE MASSAGE DYNAMIC RESPONSE OPTIMIZATION

BACKGROUND

The present invention relates generally to the field of computing, and more particularly to cognitive response systems.

Sending a text message or receiving a telephone call via a smart phone or other device is an integral part of modern communication. A text message allows for a short amount of information to be transmitted, and permits the receiver to review the information and reply to the sender at a time that is appropriate for the receiver.

SUMMARY

Embodiments of the present invention disclose a method, computer system, and a computer program product for dynamic cognitive responses. The present invention may include enabling a dynamic cognitive response program via a mobile application. The present invention may then include receiving a text message from an initiating device on a recipient device of the dynamic cognitive response program. The present invention may then include activating the dynamic cognitive response program based on the received text message. The present invention may then include analyzing the received text message on the recipient device. The present invention may include generating an intelligent response based on the analyzed received text message. The present invention may then include sending the generated intelligent response to the initiating device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
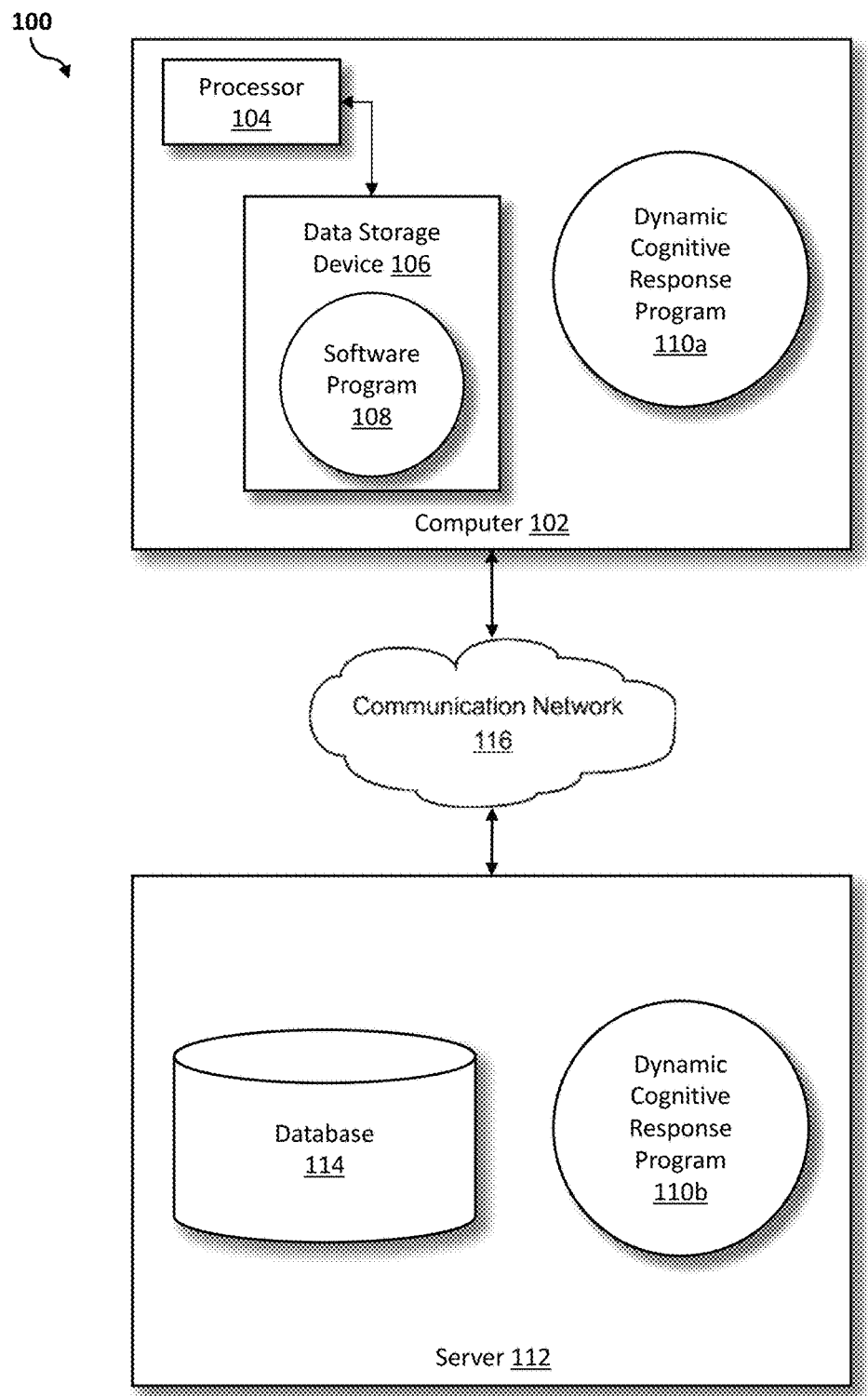
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for dynamic cognitive responses. As such, the present embodiment has the capacity to improve the technical field of cognitive response systems by enabling a mobile device or tablet computer to customize a text message to a user. The customized message may be generated based on a set of instructions provided to the mobile device or tablet computer, which instructs the mobile device or tablet computer to utilize past text message and/or telephone call data, among other things, described in more detail below, and to construct a text message based on the utilized data. This may improve the function of the mobile device or tablet computer by enabling the device to send a message based on an analysis of user data without additional or imminent user input. More specifically, the dynamic cognitive response program may be activated on a mobile device or tablet of a dynamic cognitive response program user. An initiating user may send a text message from an initiating device which may be received on the mobile device or tablet of a recipient user. The received message may be classified and analyzed by the dynamic cognitive response program, and a user database containing historical information concerning the dynamic cognitive response program users may be accessed. Based on the historical information contained within the user database, the dynamic cognitive response program may generate an intelligent response to the initiating user's text. The dynamic cognitive response program may send the generated response from the receiving device to the initiating device.

As described previously, sending a text message or receiving a phone call via a smart phone or other device is an integral part of modern communication. A text message allows for a short amount of information to be transmitted, and permits the receiver to review the information and reply to the sender at a time that is appropriate for the receiver. However, there may be a societal expectation, especially among close friends, family members, and work associates, that a text message recipient will be alerted to the received message by audio and/or visual notification, and will read the message and reply almost immediately, or within a very short period of time. This expectation may not be met in instances where the recipient is unavailable or unable to check their mobile device or tablet.

Therefore, it may be advantageous to, among other things, provide a means by which a cognitive text message response may be automatically generated and sent to an initiating user, which may be customized to the circumstances of the text message recipient, and which also may take into account any existing relationship between the recipient and the sender (i.e., initiating user).

According to at least one embodiment, the dynamic cognitive response program may automatically construct a dynamic text message in response to a received text message or received phone call on a recipient device at a time when the recipient is unavailable or unable to respond.

According to at least one embodiment, the dynamic cognitive response program may consider the time of day that a text message or call was received, the schedule of the recipient based on a connected calendar application, and any physical movement of the recipient device which may indicate that the recipient is either exercising or driving a car, among other considerations.

According to at least one embodiment, a dynamic cognitive response program user's language tone, and past relationship with the sender (i.e., initiating device), among many other variables, may be considered in determining an appropriate response to be sent to the initiating device.

According to at least one embodiment, the present invention may construct a dynamic, automatic response to a received text message or telephone call by utilizing one or more cognitive application programming interfaces (APIs) and may not depend on a database of pre-formatted or pre-set text message responses. Instead, the present invention may prepare and send a context specific text message response to a received text message or telephone call based on analysis by cognitive Watson™ (Watson and all Watson-based trademarks are trademarks or registered trademarks of International Business Machines Corporation in the United States, and/or other countries) APIs of schedule, location, and motion data, among many other categories of data on a recipient device may be used to form a succinct, cogent, and dynamic response to a received text message or telephone call. Further, while embodiments described in this application refer to IBM Watson™, any natural language analyzer that performs the same functions is contemplated.

According to at least one embodiment, the present invention may be a cognitive message response optimization tool which may be implemented in the form of a mobile application on a smart phone or tablet device, and which may analyze calendar and global positioning system (GPS) information of an initiating device and a recipient device, as well as past text messages sent from the initiating device to the recipient device and vice versa, in order to construct a cognitive response to a received text message or telephone call. In some embodiments, the cognitive application may be an embedded feature of a messaging application.

According to at least one embodiment, the present invention may classify a received text message using a natural language classifier API (e.g., Watson™ Natural Language Classifier API), the present invention may analyze the tone of a received text message using a tone analyzer API (e.g., Watson™ Tone Analyzer API), and the present invention may assess the personality of a user of the initiating device using a personality insights API (e.g., Watson™ Personality Insights API).

According to at least one embodiment, the present invention may analyze sensor and application data from a dynamic cognitive response program user's mobile device or tablet, including but not limited to GPS, calendar, and accelerometer data, to construct an automatic real time, cognitive text message response to a received text message or telephone call, without any input from the recipient user.

According to at least one embodiment, the present invention may analyze sensor data received from a connected device (e.g., smartwatch, fitness tracker) when generating the intelligent response. For example, the dynamic cognitive response program may receive heartrate and/or GPS data from a connected smartwatch and, based on the received data, determine that the dynamic cognitive response program's user is exercising and unable to immediately respond to a received text message.

According to at least one embodiment, the present invention may aid recipients of a text message or telephone call in providing a text message response to an initiating device at a time when a recipient is unable to respond. The present invention may result in quicker, smarter responses which are based on current information of the recipient and initiating devices, and are not selected from a database of preprogrammed responses.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a dynamic cognitive response program 110a. The networked computer environment 100 may also include a server 112 that is enabled to run a dynamic cognitive response program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the dynamic cognitive response program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the dynamic cognitive response program 110a, 110b (respectively) to analyze a received text message and, in response to the received text message, generate a customized response taking into consideration, among other things, who the message is received from, the time of day that the message is received, the subject of the received message, the tone of voice of the received message, and the schedule and location of the message recipient. The dynamic cognitive response method is explained in more detail below with respect to FIGS. 2 and 3.

Figure 2:
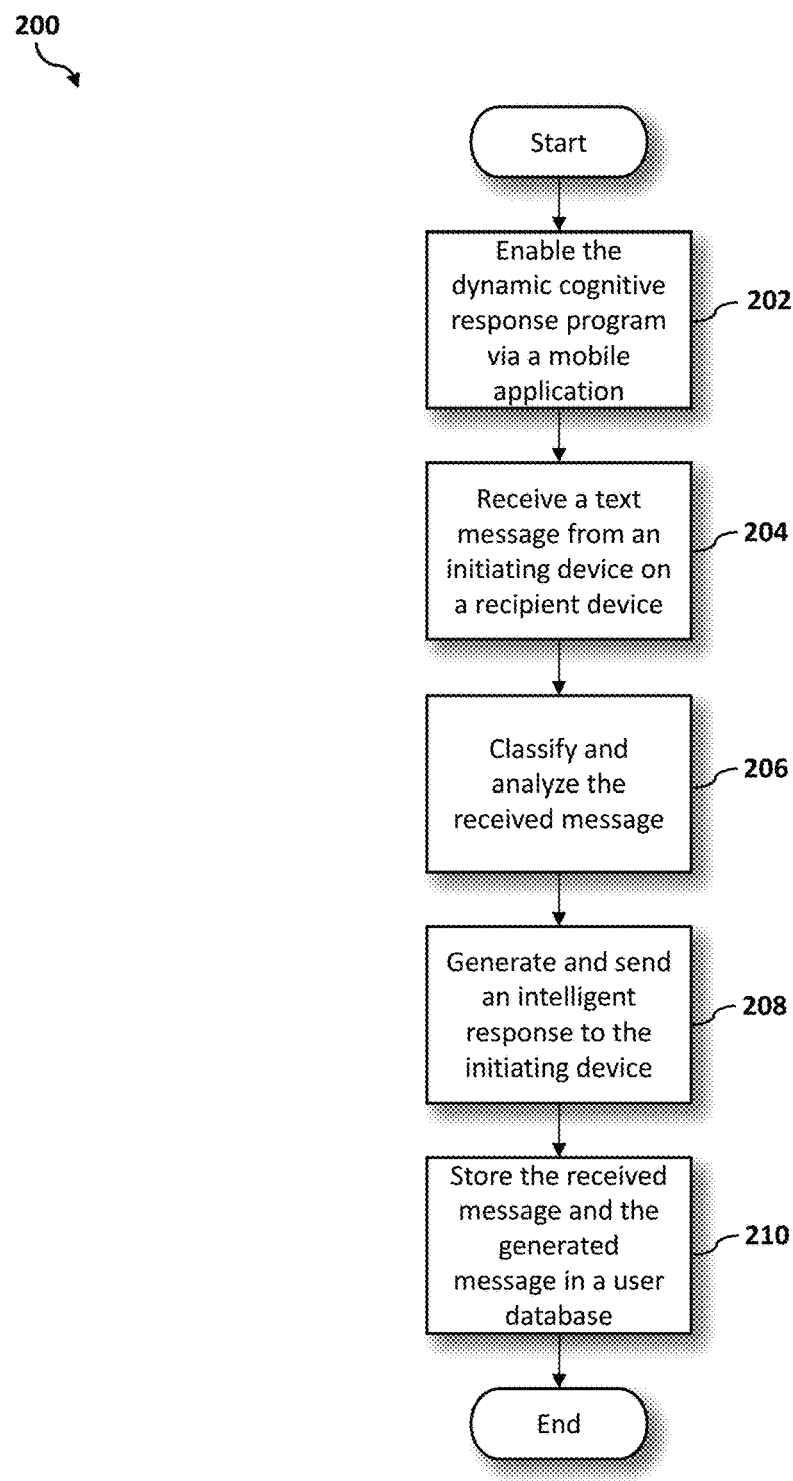
FIG. 2 is an operational flowchart illustrating a process for dynamic cognitive responses according to at least one embodiment.

Referring now to FIG. 2, an operational flowchart illustrating the exemplary dynamic cognitive response process 200 used by the dynamic cognitive response program 110a and 110b according to at least one embodiment is depicted.

At 202, the dynamic cognitive response program 110a, 110b is enabled via a mobile application on a user's mobile device or tablet. The dynamic cognitive response program 110a, 110b may be downloaded from a cloud server onto the user's mobile device or tablet and may be enabled or disabled at the discretion of the user and within the interface of the mobile application. The user may have the option to enable the dynamic cognitive response program 110a, 110b for a designated set of hours per day, based on the fact that the user can predict being unable to reply to received messages during a designated time. For example, the user may designate within the dynamic cognitive response program 110a, 110b that the program will be enabled from the hours of 8 AM EST to 5 PM EST, during which time the user will be at work.

At 204, a recipient device receives a text message from an initiating device. When the current time (i.e., a current time value) minus the time that a text message is received (i.e., a received time value) exceeds a preconfigured amount of time (i.e., an activation time value) that the recipient device will wait for a recipient device user to provide a response, then the dynamic cognitive response program 110a, 110b may generate a cognitive response which may be sent from the recipient device to the initiating device (as described in more detail below). The activation time value may be configured by the user of the dynamic cognitive response program 110a, 110b and may be modified within the dynamic cognitive response program 110a, 110b interface to suit the user's current availability.

For example, Matt receives a text message on his mobile smart phone device from Sally at 10:35 AM, which says, "Hi, how is your day going? Can you pick up the kids after work?" Matt is in a business meeting when the message is received and is unable to provide an immediate response. Matt has configured the activation time value within the dynamic cognitive response program 110a, 110b interface to equal 15 minutes. Therefore, when the current time value is equal to 10:50 AM, then the configured activation time value of 15 minutes (i.e., the current time value minus the received time value) will be reached and the dynamic cognitive response program 110a, 110b will begin to generate a targeted, cognitive response back to Sally.

At 206, the recipient device classifies and analyzes the received text message. The dynamic cognitive response program 110a, 110b may utilize a maintained user database, as well as a natural language processor, such as Watson™ technologies, to classify and analyze the received text message. The user database may be maintained within the dynamic cognitive response program 110a, 110b, and, if permitted (e.g., consented to) by the user of the dynamic cognitive response program 110a, 110b, the user database may include, but is not limited to including, text message information, calendar information, and GPS location of the recipient device. Permissions (e.g., consent) to access information stored on the recipient device may be given upon download of the dynamic cognitive response program 110a, 110b, and may be modified at any time within the dynamic cognitive response program's 110a, 110b interface.

As described previously, the user database may be maintained within the dynamic cognitive response program 110a, 110b, and may include, but is not limited to including, calendar data, GPS data, motion data (including data from an accelerometer), microphone data, and sensor data retrieved from the recipient device. The user database may also include previous text messages exchanged between the initiating device and the recipient device, to assess the relationship between the initiating device user and the recipient device user, including the users' familiarity with one another, the users' standard level formality, and the users' inclination to provide a surplus of detail during usual conversation. The user database may also include data (e.g., motion data, GPS data, heartrate data) from connected devices, such as the user's smartwatch.

In some instances, there may be no text message history between the recipient user and the initiating user.

Based on the determined location of the recipient device, as indicated by the recipient device's GPS data, the dynamic cognitive response program 110a, 110b may alert the dynamic cognitive response program 110a, 110b user to the received text message by pop up within the dynamic cognitive response program 110a, 110b interface, by alert on the dynamic cognitive response program 110a, 110b user's mobile device or tablet, or by projection of a sound from the dynamic cognitive response program 110a, 110b user's mobile device or tablet. For example, the dynamic cognitive response program 110a, 110b user may indicate within the dynamic cognitive response program's 110a, 110b interface that an alert should be provided when a text message is received from a specified person, or when the dynamic cognitive response program 110a, 110b user's GPS data indicates that the user is located at a specified location.

The natural language processing technologies, such as Watson™ technologies, used by the dynamic cognitive response program 110a, 110b may include a natural language classifier API (e.g., Watson™ Natural Language Classifier API), a tone analyzer API (e.g., Watson™ Tone Analyzer API), and a personality insights API (e.g., Watson™ Personality Insights API).

Utilizing the natural language classifier API, such as Watson™ Natural Language Classifier API, the words used in the received text message may be analyzed to determine whether they are emotional (e.g., angry, sad, happy, anxious, funny, sarcastic, etc.), systematic, or inquisitive, and the messages may be classified accordingly. During an analysis of the received text message, the Watson™ Natural Language Classifier API may also consider the use of punctuation, including exclamation marks, as well as capital letters, to portray a classified emotion. For example, a received text message which reads, "Hey, where are you?" will be classified as systematic or inquisitive, depending on who the text message is from and what time the text message is received. On the other hand, a received text message which reads, "We've had a huge problem at home. Call me back IMMEDIATELY." will be classified as emotional, and likely even anxious.

The tone analyzer API, such as Watson™ Tone Analyzer API, may utilize the user database of historical information, including past conversations between the initiating user and the recipient user, to determine whether the received text message depicts a tone which is intense, lighthearted, serious, whimsical, or witty, among many other tones of voice.

The personality insights API, such as Watson™ Personality Insights API, may further utilize the user database of historical information to determine the user's general mood based on text message history, past use of emotional language, and past use of punctuation.

Continuing with the above example depicting Matt and Sally, based on prior consent to access information stored on Matt's mobile device, given by Matt, the dynamic cognitive response program 110a, 110b accesses Matt's calendar application, GPS location, accelerometer, microphone, and data generated from light and motion sensors on Matt's device, to determine that Matt is involved in a work meeting and is likely unable to use his mobile device to respond to Sally's message. As a result, the dynamic cognitive response program 110a, 110b analyzes past text messages between Sally and Matt to determine if there are phrases which are commonly used by Matt, whether similar conversations have previously been had between Sally and Matt, and if so, what words were used by Matt in that similar conversation.

The Watson™ Natural Language Classifier API classifies the received text message sent by Sally as systematic and inquisitive, the Watson™ Tone Analyzer API assesses the tone of voice of the received text message sent by Sally as lighthearted, and the Watson™ Personality Insights API assesses Sally's personality based on the text message history between Matt and Sally. Since Matt and Sally have extensive text message history, this is a large part of the dynamic cognitive response program's 110a, 110b analysis.

At 208, the recipient device generates and sends an intelligent response to the received text message back to the initiating device. As described previously, the generated response (e.g., a customized response) may be based on text message history and the relationship between the recipient user and the initiating user, the schedule of the recipient user, the location of the recipient user, and the time of day that the text message is received, among many other considerations.

As described previously, there may be instances where there is no text message history between the recipient user and the initiating user. In these instances, the dynamic cognitive response program 110a, 110b may respond with a standard text message response (e.g., form response, pre-loaded response, conventional response). Furthermore, in instances where the initiating user's name is recognized by the recipient user's mobile device or tablet but there is no prior text message history between the initiating user and the recipient user, then the dynamic cognitive response program 110a, 110b may generate a response which modifies the form text message response to incorporate the initiating user's name but does not include any additional personalized details (e.g., a semi-form response).

Continuing with the above example, the dynamic cognitive response program 110a, 110b constructs a response to Sally's text message based on an analysis of data on Matt's phone, as described previously at 206. Based on the information contained within Matt's calendar, and considering Matt and Sally's previous text message history, the dynamic cognitive response program 110a, 110b generates a message which says, "Hi I am in a work meeting right now, but according to my schedule I can pick up the kids at around 3:30 PM today." The dynamic cognitive response program 110a, 110b may further indicate to Sally the time that Matt will be available, based on Matt's calendar schedule. The dynamic cognitive response program 110a, 110b sends the generated message to Sally's phone.

At 210, the received message and the generated message are stored in a user database. As described previously, assuming consent of the user is given, the user database may contain text message history of the initiating user and of the recipient user. Accordingly, the received text message and the generated text message may be stored in the user database, located on a cloud environment or locally stored on the user's mobile device or tablet, and may be used to generate a response to future text messages received on the recipient device.

Figure 3:
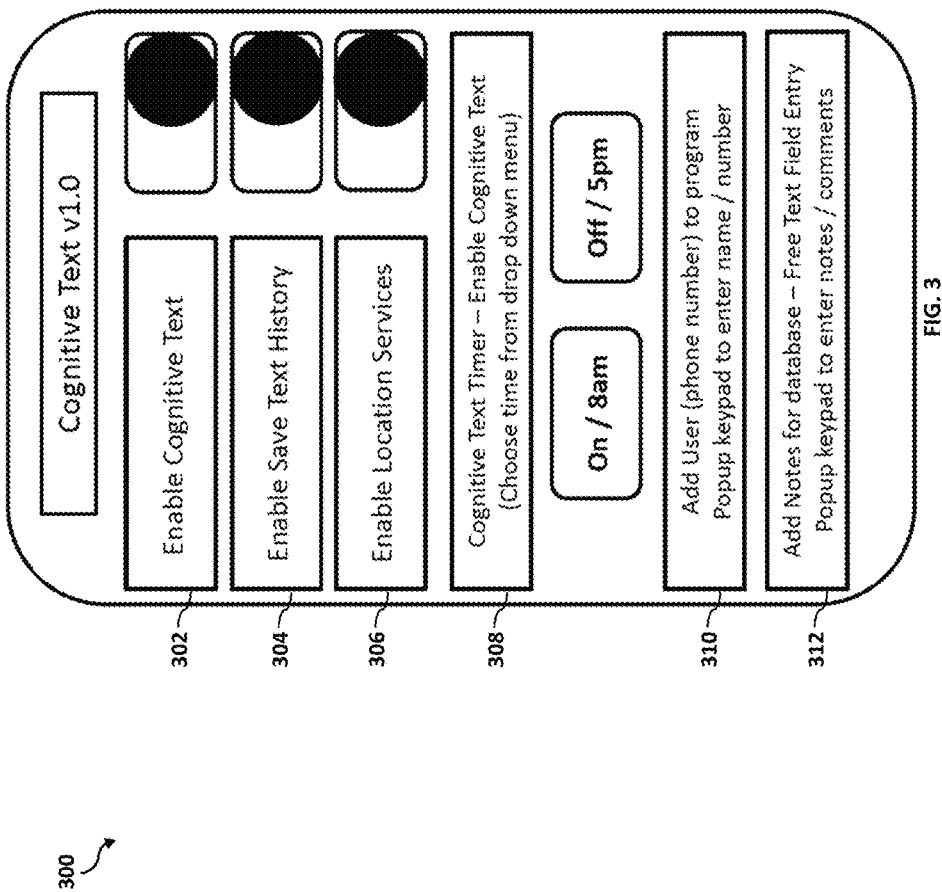
FIG. 3 is a block diagram of the dynamic cognitive response program interface according to at least one embodiment.

Referring now to FIG. 3, a block diagram of the dynamic cognitive response program 110a, 110b interface 300 according to at least one embodiment is depicted. Within the dynamic cognitive response program 110a, 110b interface, a user may enable cognitive text 302 to permit the dynamic cognitive response program 110a, 110b to generate a cognitive text message in the event of user unavailability; enable save text history 304 to permit the dynamic cognitive response program 110a, 110b to save received and generated text messages; enable location services 306 to permit the dynamic cognitive response program 110a, 110b to access a user's GPS; and enable a cognitive text timer 308 to specify the hours in which the dynamic cognitive response program 110a, 110b will be enabled. A user may also add a telephone number 310 and additional notes 312 within the user's own dynamic cognitive response program 110a, 110b interface 300.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
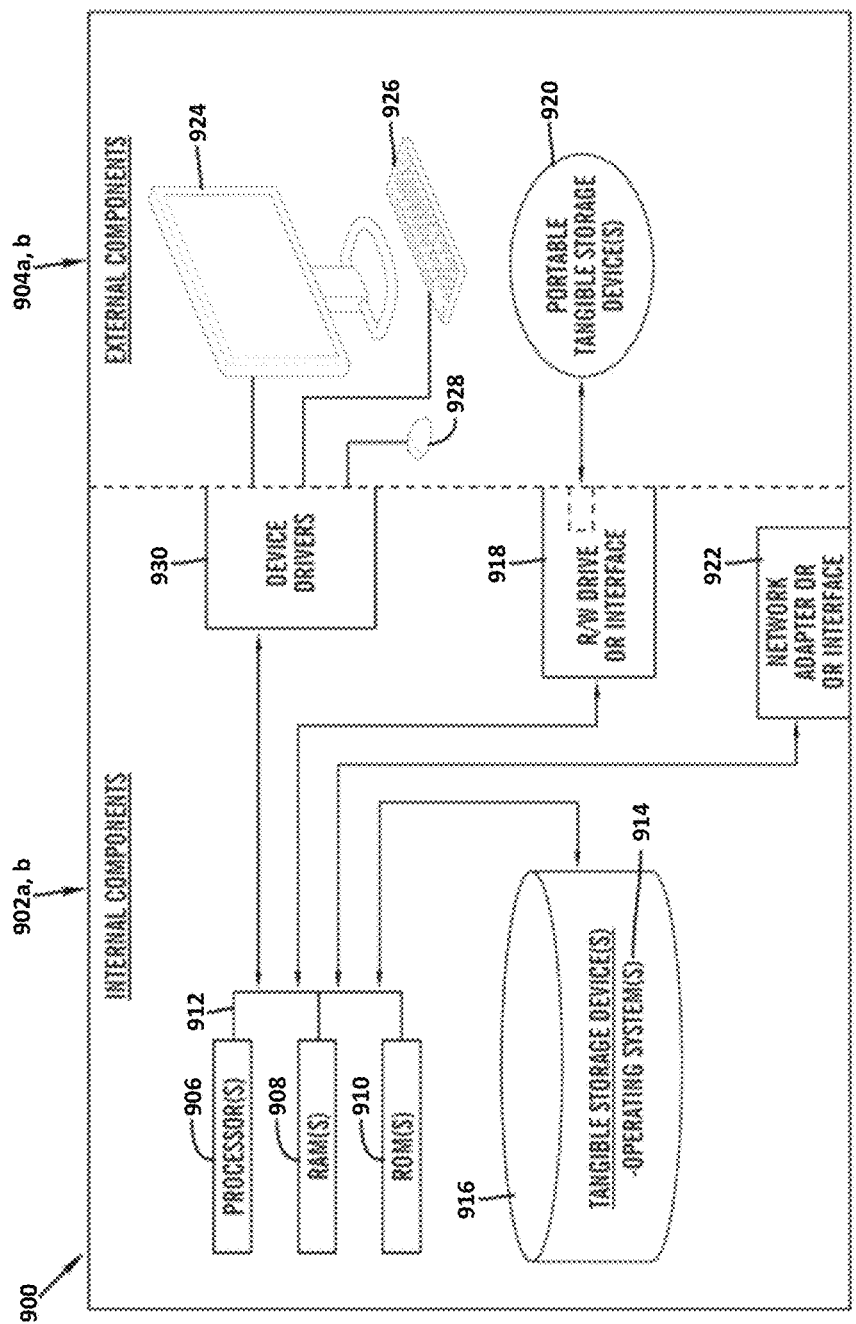
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the dynamic cognitive response program 110a in client computer 102, and the dynamic cognitive response program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the dynamic cognitive response program 110*a* and 110*b* can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the dynamic cognitive response program 110*a* in client computer 102 and the dynamic cognitive response program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the dynamic cognitive response program 110*a* in client computer 102 and the dynamic cognitive response program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
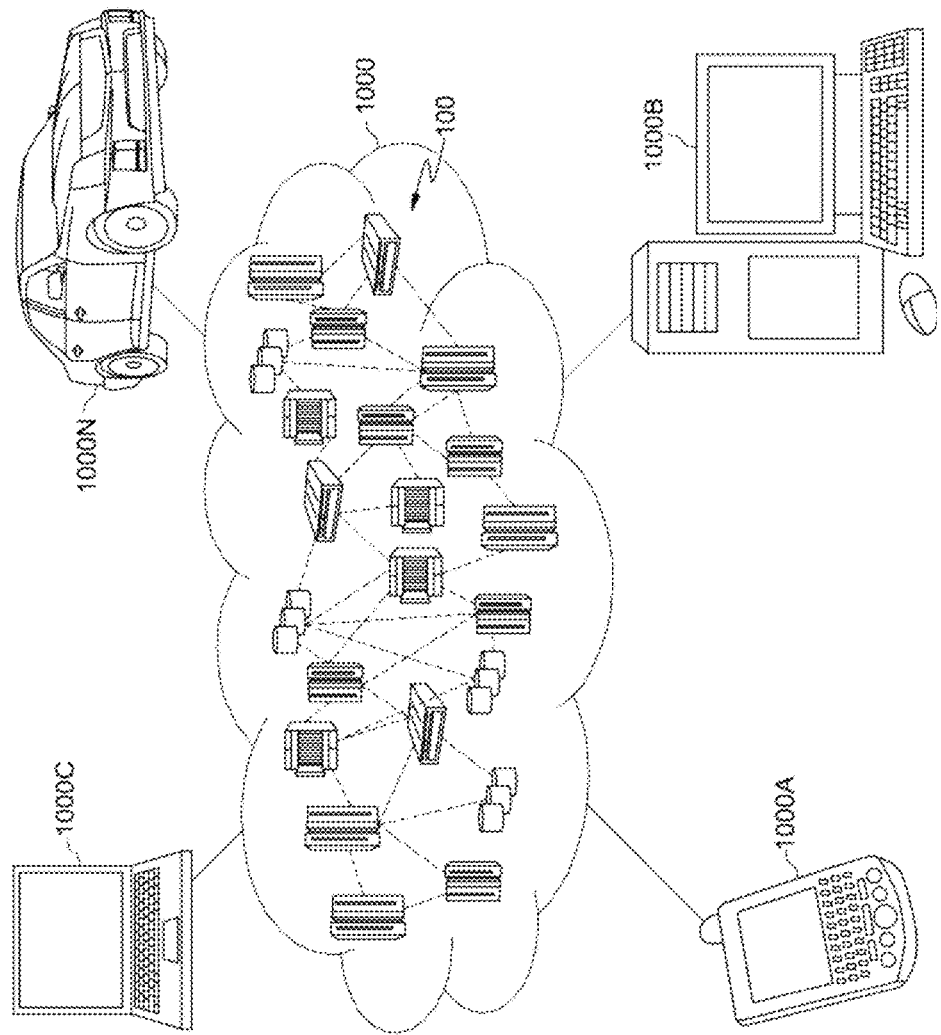
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
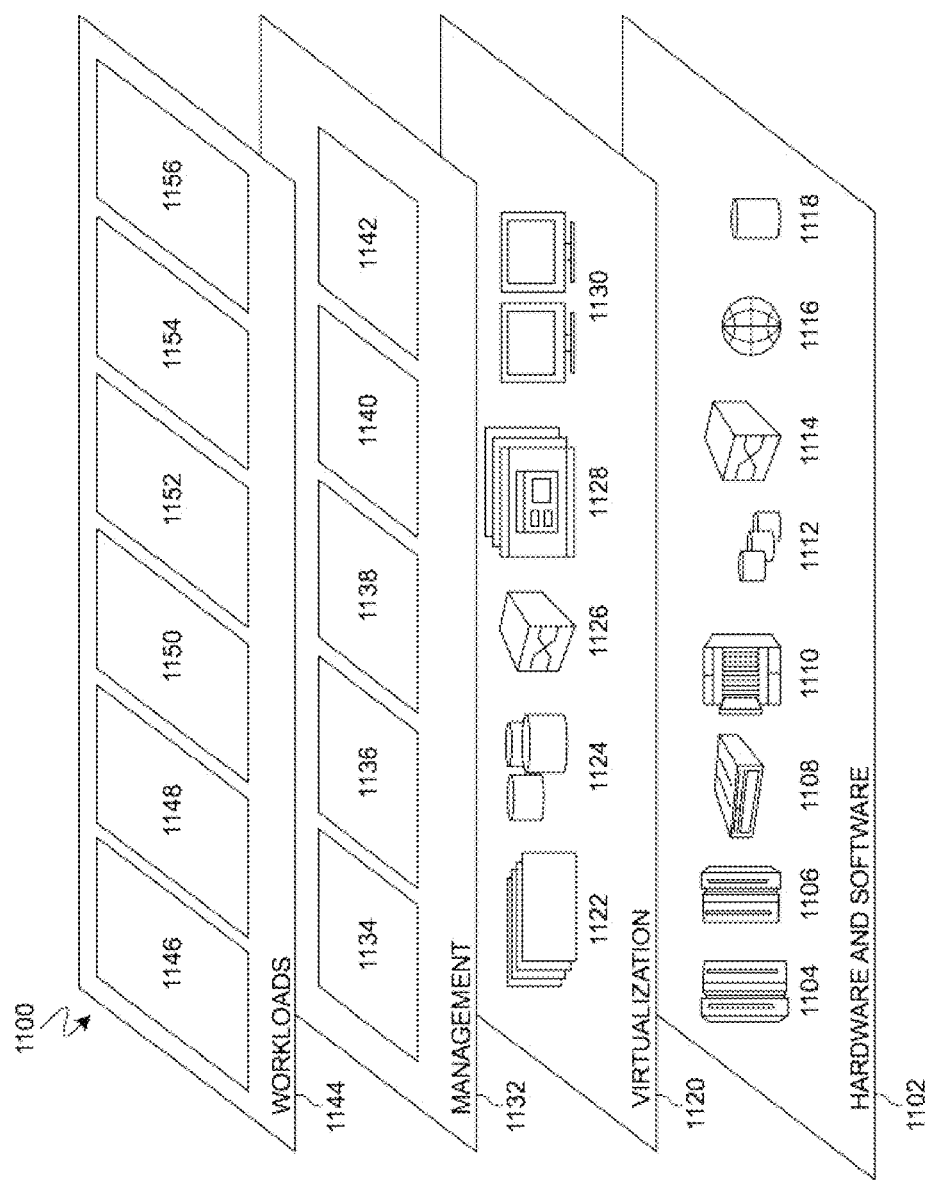
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and dynamic cognitive response 1156. A dynamic cognitive response program 110a, 110b provides a way to customize an automatic text message response based on a recipient's current location, time constraints, and relationship to the text message sender.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating dynamic cognitive responses, the method comprising:
   enabling a dynamic cognitive response program via a mobile application;
   receiving, by a recipient device, a text message from an initiating device;
   activating, on the recipient device, the dynamic cognitive response program based on the received text message;
   determining that a current time value minus a received time value is greater than or equal to an activation time value;
   analyzing the received text message on the recipient device;
   generating an intelligent response based on the analyzed received text message; and
   sending the generated intelligent response to the initiating device.

2. The method of claim 1, wherein analyzing the received text message on the recipient device further comprises:
   classifying the received text message; and
   accessing a user database based on the classified received text message.

3. The method of claim 2, wherein the user database is comprised of a plurality of calendar data, a plurality of global positioning system data, a plurality of motion data, a plurality of microphone data, and a plurality of sensor data.

4. The method of claim 3, further comprising customizing the generated intelligent response based on a classification of the received text message and a plurality of calendar data.

5. The method of claim 2, further comprising storing the received text message and generated intelligent response in the user database.

6. The method of claim 1, wherein the generated intelligent response is selected from the group consisting of a form response, a semi-form response, and a customized response.

7. A computer system for generating dynamic cognitive responses, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
enabling a dynamic cognitive response program via a mobile application;
receiving, by a recipient device, a text message from an initiating device;
activating, on the recipient device, the dynamic cognitive response program based on the received text message;
determining that a current time value minus a received time value is greater than or equal to an activation time value;
analyzing the received text message on the recipient device;
generating an intelligent response based on the analyzed received text message; and
sending the generated intelligent response to the initiating device.

8. The computer system of claim 7, wherein analyzing the received text message on the recipient device further comprises:
classifying the received text message; and
accessing a user database based on the classified received text message.

9. The computer system of claim 8, wherein the user database is comprised of a plurality of calendar data, a plurality of global positioning system data, a plurality of motion data, a plurality of microphone data, and a plurality of sensor data.

10. The computer system of claim 8, wherein the user database is maintained and updated by the dynamic cognitive response program.

11. The computer system of claim 8, further comprising storing the received text message and generated intelligent response in the user database.

12. The computer system of claim 7, wherein the generated intelligent response is selected from the group consisting of a form response, a semi-form response, and a customized response.

13. A computer program product for generating dynamic cognitive responses, comprising:
one or more computer-readable storage media and program instructions stored on at least one of the one or more tangible storage media, the program instructions executable by a processor to cause the processor to perform a method comprising:
enabling a dynamic cognitive response program via a mobile application;
receiving, by a recipient device, a text message from an initiating device;
activating, on the recipient device, the dynamic cognitive response program based on the received text message;
determining that a current time value minus a received time value is greater than or equal to an activation time value;
analyzing the received text message on the recipient device;
generating an intelligent response based on the analyzed received text message; and
sending the generated intelligent response to the initiating device.

14. The computer program product of claim 13, wherein analyzing the received text message on the recipient device further comprises:
classifying the received text message; and
accessing a user database based on the classified received text message.

15. The computer program product of claim 14, wherein the user database is comprised of a plurality of calendar data, a plurality of global positioning system data, a plurality of motion data, a plurality of microphone data, and a plurality of sensor data.

16. The computer program product of claim 14, wherein the user database is maintained and updated by the dynamic cognitive response program.

17. The computer program product of claim 14, further comprising storing the received text message and generated intelligent response in the user database.

* * * * *